United States Patent
Marsh

(10) Patent No.: US 9,605,775 B2
(45) Date of Patent: Mar. 28, 2017

(54) CLAMP FOR SECURING PIPE

(71) Applicant: William Marsh, Red Deer (CA)

(72) Inventor: William Marsh, Red Deer (CA)

(73) Assignee: William Marsh, Red Deer (CA)

( * ) Notice: Subject to any disclaimer, the term of this patent is extended or adjusted under 35 U.S.C. 154(b) by 140 days.

(21) Appl. No.: 14/288,483

(22) Filed: May 28, 2014

(65) Prior Publication Data

US 2014/0353436 A1 Dec. 4, 2014

(30) Foreign Application Priority Data

May 28, 2013 (CA) ........................................ 2816778

(51) Int. Cl.
*F16L 3/22* (2006.01)
*F16L 3/237* (2006.01)
*E21B 19/15* (2006.01)

(52) U.S. Cl.
CPC ............... *F16L 3/237* (2013.01); *E21B 19/15* (2013.01)

(58) Field of Classification Search
CPC ... F16L 3/223; F16L 3/222; F16L 3/23; F16L 3/237; E21B 19/15; F16B 2/12; F16B 2/065
USPC ........................... 24/460, 461, 486, 525, 569
See application file for complete search history.

(56) References Cited

U.S. PATENT DOCUMENTS

| | | | | |
|---|---|---|---|---|
| 614,880 A | * | 11/1898 | Miller | F16B 2/12 248/229.12 |
| 789,513 A | * | 5/1905 | White | B25B 13/16 24/569 |
| 1,285,237 A | * | 11/1918 | Kopcinski et al. | A22B 5/06 24/525 |
| 1,285,517 A | * | 11/1918 | White | B60J 7/1855 24/525 |
| 1,450,732 A | * | 4/1923 | Mueller | F16B 2/12 248/229.12 |
| 1,932,009 A | * | 10/1933 | Becker | H01R 4/42 24/525 |
| 2,863,203 A | * | 12/1958 | Dalpiaz | F16L 3/23 24/279 |
| 2,877,974 A | * | 3/1959 | Estes | E04B 9/18 248/228.3 |
| 2,973,675 A | * | 3/1961 | Johansson | B25B 1/125 269/190 |
| 4,190,165 A | * | 2/1980 | Collins | B65D 57/00 211/59.4 |
| 4,244,542 A | * | 1/1981 | Mathews | F16L 3/222 138/112 |

(Continued)

*Primary Examiner* — Bradley Duckworth
(74) *Attorney, Agent, or Firm* — Brownstein Hyatt Farber Schreck LLP; Cara L. Crowley-Weber; E. Peter Johnson

(57) ABSTRACT

The subject matter relates to a clamp for use in disengagably locking together a pair of cylindrical tubular joints of pipe, such as oilfield drill pipe or casing, to convert them into a non-rotatable flat beam. The clamp includes a pair of jaws that are formed to closely conform to the curvature of the outside side surfaces of the two pipe joints. The ends of the jaws extend down past the midlines of the two outer surfaces. The clamp also includes an assembly for holding and moving the jaws together and apart. Once the clamp is positioned over the pair of joints and tightened against their side surfaces they lock the joints together. This locking of the jaws after tightening can be accomplished using a threaded bolt.

4 Claims, 5 Drawing Sheets

(56) References Cited

U.S. PATENT DOCUMENTS

| | | | | |
|---|---|---|---|---|
| 5,276,949 A * | 1/1994 | Cordellini | F16B 2/12 | |
| | | | 24/525 | |
| 5,586,373 A * | 12/1996 | Eby | B25B 1/103 | |
| | | | 24/525 | |
| 5,769,292 A * | 6/1998 | Cucheran | B60R 9/045 | |
| | | | 224/319 | |
| 5,827,441 A * | 10/1998 | Solbjorg | F16L 1/06 | |
| | | | 248/68.1 | |
| 7,179,010 B2 * | 2/2007 | Weger | F16L 3/24 | |
| | | | 248/72 | |
| 7,310,864 B1 * | 12/2007 | Gingerich | B25B 1/103 | |
| | | | 269/147 | |
| 7,850,016 B2 * | 12/2010 | Trisler | E21B 19/15 | |
| | | | 211/70.4 | |
| 8,403,280 B2 * | 3/2013 | Halverson | H04R 1/08 | |
| | | | 248/228.5 | |
| 2008/0078913 A1 * | 4/2008 | Vito | A63B 55/50 | |
| | | | 248/346.03 | |
| 2008/0116345 A1 * | 5/2008 | O'Malley | B65D 19/44 | |
| | | | 248/346.01 | |
| 2008/0189920 A1 * | 8/2008 | Toombs | E04G 7/18 | |
| | | | 24/604 | |
| 2011/0271498 A1 * | 11/2011 | Price | B25B 5/102 | |
| | | | 24/457 | |
| 2011/0280651 A1 * | 11/2011 | Chiang | E04G 5/00 | |
| | | | 403/322.4 | |
| 2014/0014797 A1 * | 1/2014 | McSherry | F16B 2/12 | |
| | | | 248/231.41 | |

* cited by examiner

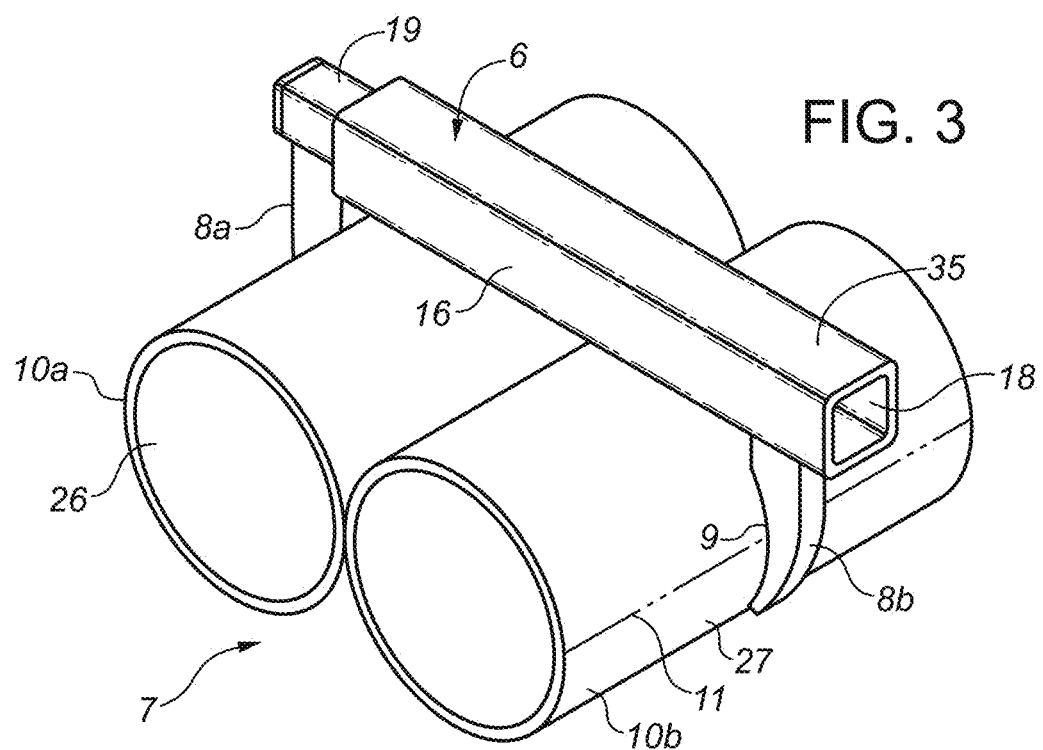
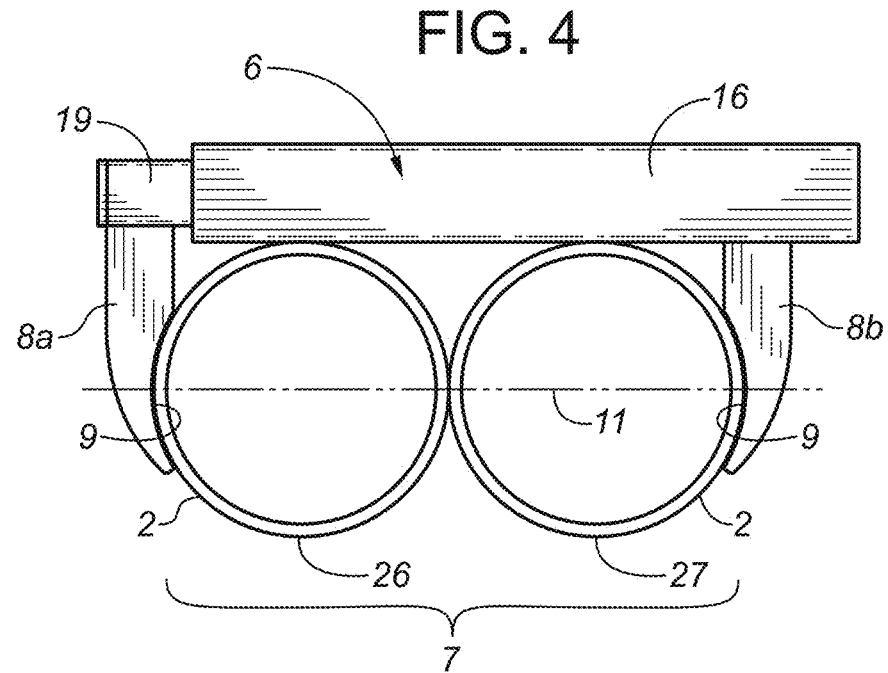

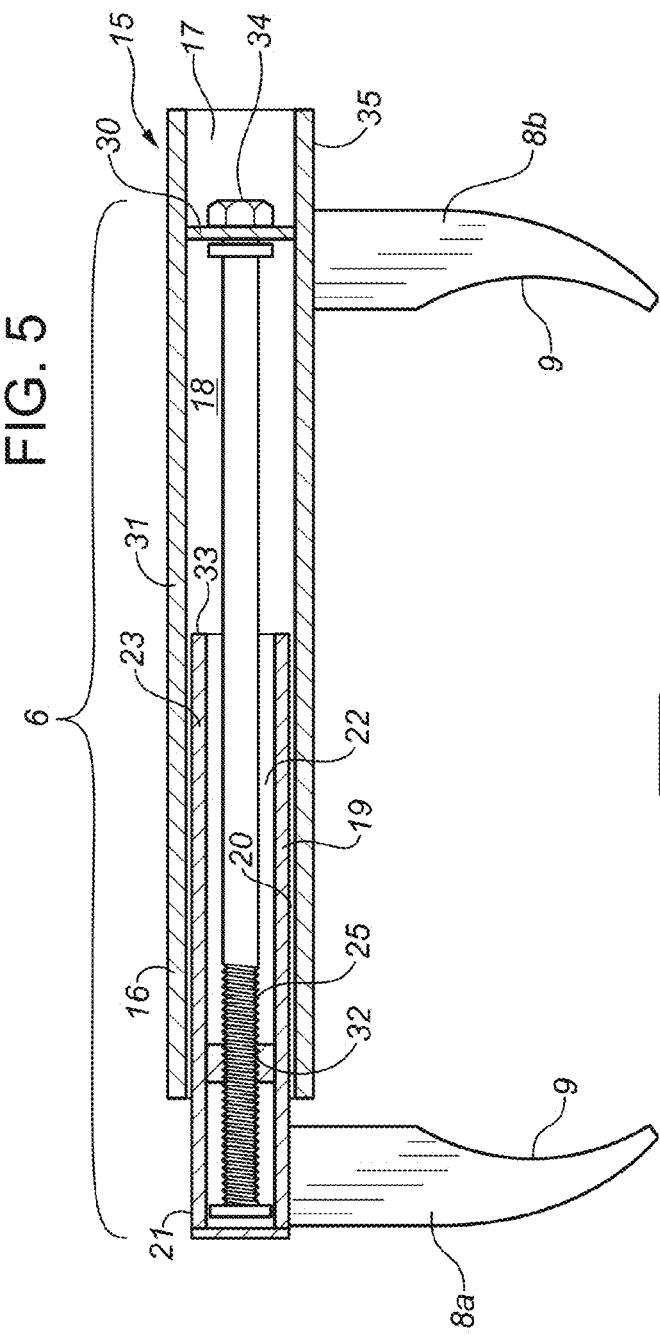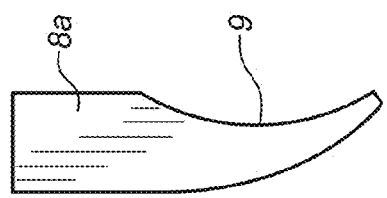

CLAMP FOR SECURING PIPE

FIELD OF INVENTION

The subject matter relates to a clamp for use in securing pipe, in particular industrial pipe such as oilfield pipe.

BACKGROUND

The present invention was developed for use in connection with oilfield pipe, such as heavy joints of drill pipe and well casing that are commonly stored on pipe racks. These pipe joints are tubular, cylindrical, commonly 30 feet in length and weigh hundreds of pounds. The invention will be described herein in connection with such pipe. However, it is anticipated that the invention may find application in other environments where heavy pipe joints are temporarily stored or are being conveyed.

Typically, oilfield pipe is rolled onto, and often stacked, on parallel, elongate, spaced apart pipe racks. The end joints are usually blocked from rolling off the ends of the racks by wooden wedges or chocks. However these chocks can fail if a joint rolls over them and gets loose.

Another problem arises if pipe joints are being moved around with a forklift. They can easily become unbalanced and loose.

There have been many injuries over the years to oilfield personnel working around the joints of pipe, due to the joints "getting loose".

Therefore there still exists a need for a viable device which can help in better controlling pipe joints.

SUMMARY OF THE INVENTION

The present invention is directed to providing a clamp which may be positioned over a pair of abutting or contiguous joints of tubular, cylindrical oilfield pipe, the clamp having jaws which may be tightened together and locked against the outer side surfaces of the pair of joints to temporarily lock them together. The clamp thereby converts the pair of joints into a flat, essentially non-rotatable structure which can serve a chocking function at the end of a row of joints.

Each clamp comprises:

a pair of jaws having opposed, rounded, concave inside surfaces configured and dimensioned to conform with the outer side surfaces of the pair of pipe joints and to extend down past their midlines; and an assembly for supporting the jaws and moving them together and apart, so that they may be positioned over the pair of joints and tightened against the side surfaces to disengagably lock the joints together in contiguous contact and convert them into a flat, non-rotatable structure.

Because the inner surfaces of the jaws, when applied, extend beneath the midlines of the joints, the clamp resists upward dislodgement in an environment of violent side impacts.

FIGURES

FIG. 3 is a perspective view of the clamp of FIG. 1, secured to sections of two pipe joint ends;

FIG. 4 is an end view of the assembly of FIG. 3;

FIG. 5 is a side sectional view of the clamp;

FIG. 6 is a side view of a jaw of the clamp; and

DESCRIPTION OF THE PREFERRED EMBODIMENT

Figure 1:
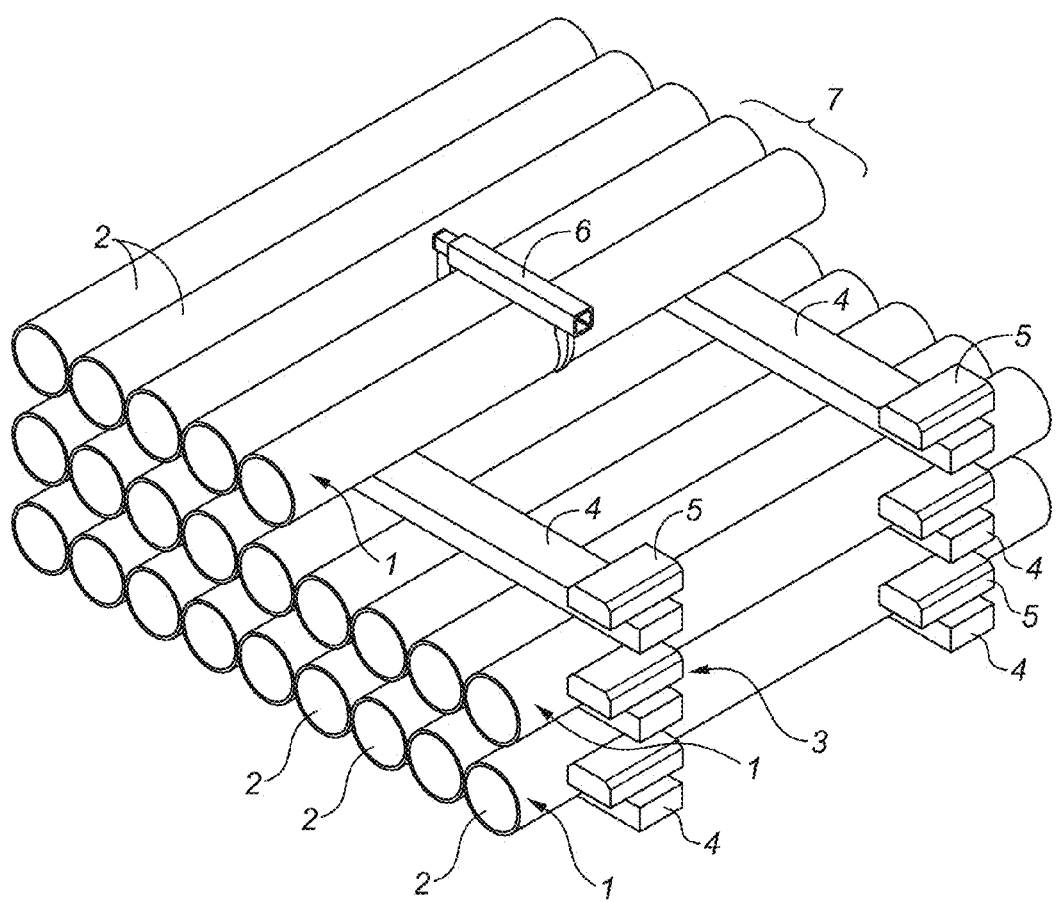
FIG. 1 is a perspective view of joints of pipe stacked on a rack with a clamp in position over a pair of ends of two joints—the Figure further shows typical prior art wooden chocks, shown for comparison.

Referring to FIG. 1, rows 1 of cylindrical, tubular, steel joints 2 of oilfield pipe are shown, stacked horizontally, as they would be on a pipe rack (not shown). Planks 4 separate and support the pipe rows 1. At the ends of these planks are wooden chocks 5, which exemplify the typical prior art means used for preventing the pipe joints 2 from rolling off the pipe rack. However, these wooden chocks 5 are often incapable of adequately ensuring that the pipe joints stay on the racks.

Figure 2:
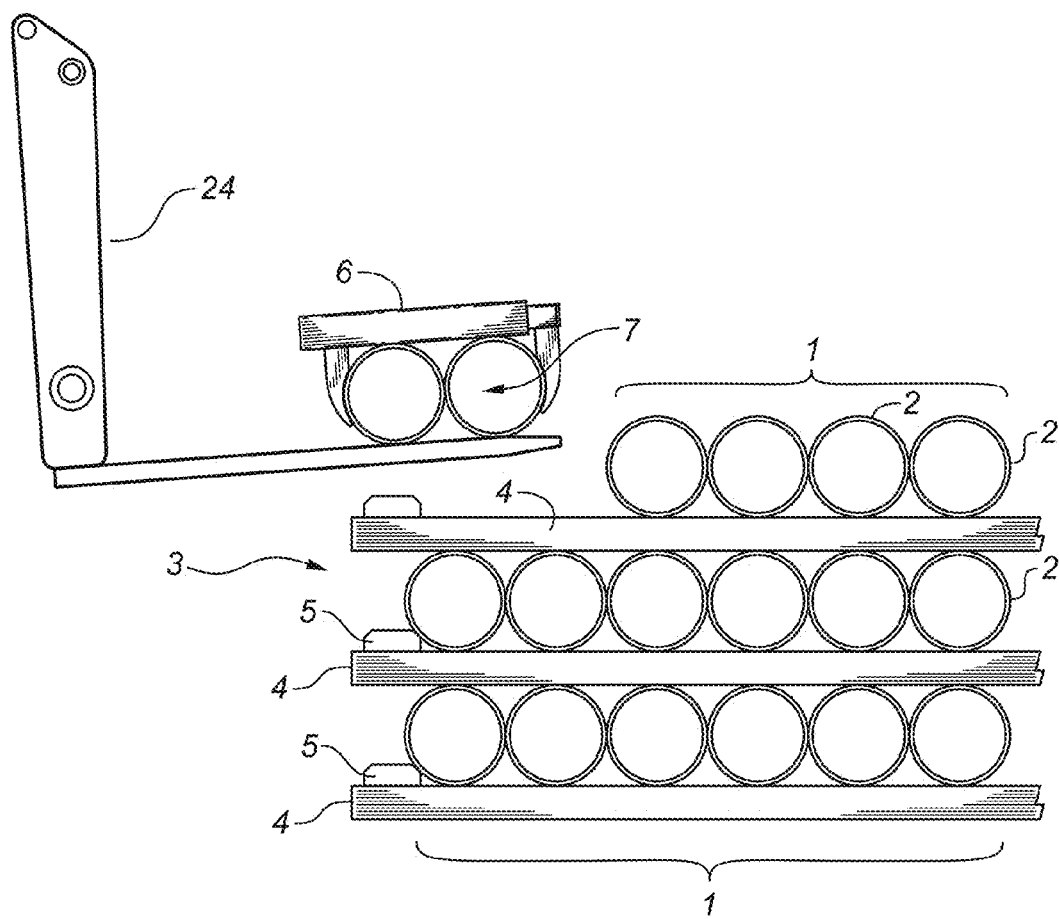
FIG. 2 is a side view showing a pair of pipe joints, converted into a flat, non-rotatable structure by a pair of clamps, in the process of being placed by a forklift onto a stack of pipe joints.

Further referring to FIG. 1, a clamp 6 is shown in use, disengagably locking together a pair of pipe joints 2. A pair of the clamps 6 is applied to convert the pair of pipe joints into a flat structure or beam 7 that resists rotation. In FIG. 2, the clamps are shown in the context of a forklift 24 lifting the flat structure 7 onto stacked rows 1 of pipe joints 2.

The clamp 6 comprises a pair of downwardly extending, spaced apart jaws 8a, 8b. The jaws have opposed concave inner surfaces 9 that are configured and dimensioned to conform with the outer side surfaces 10a, 10b of the pipe joints 2. As shown in FIG. 3, the jaws 8a, 8b extend downward sufficiently so that their concave surfaces 9 extend past the notional midlines 11 of the pipe joints 2.

Figure 7:
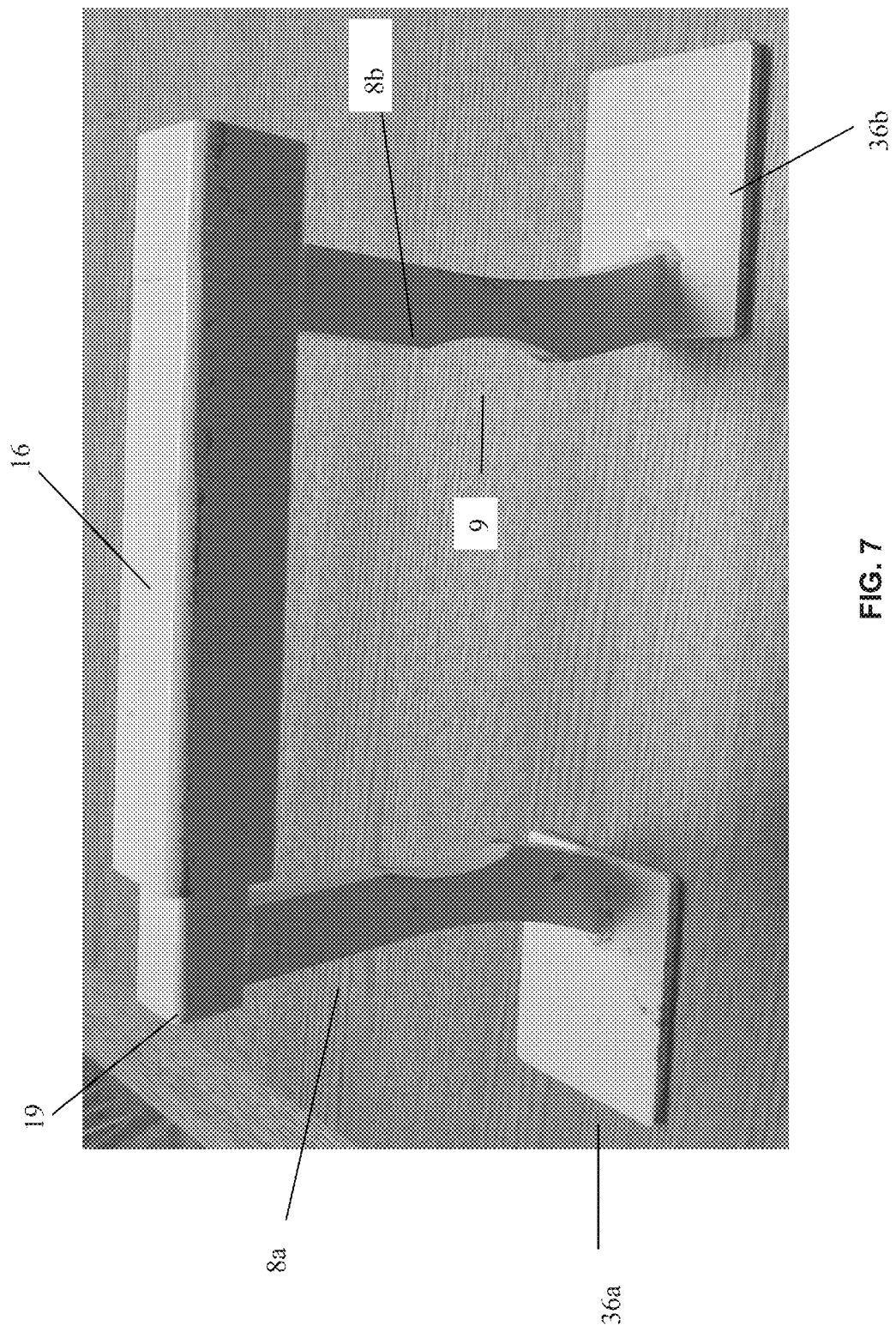
FIG. 7 is a perspective side view of a second embodiment of the clamp, having stabilizing members or feet attached to the jaws.

As shown in FIG. 7, the jaws 8a, 8b, may also each include a laterally extending foot, 36a, 36b at its base and positioned beneath the concave surface 9 associated therewith. In this embodiment, the clamp 6 may be used to clamp onto a single pipe joint 2. A pipe joint lying on unleveled ground may result in the pipe joint rolling and causing injury. When the clamp is locked onto the pipe joint, it is stabilized and therefore its ability to roll is limited.

It is the combination of the length of the jaws and the curvature of their inner surfaces, which are dictated by the size and curvature of the pipe joints involved, that allows the clamp to remain secured to the pipe joints, once tightened against and locked in place against the pipe side surfaces. By extending down past the notional midlines 11, the clamp 6 resists being lifted off the engaged pipe joints 2 as the jaws engage the undersides 26, 27 of the pipe joints 2, until the clamp is opened.

As the diameter of the pipe involved can vary from one situation to another, the clamp 6 necessarily has to be dimensioned and configured to properly engage the pipe.

The jaws 8a, 8b are supported and operated by an assembly 15 which enables the jaws to be moved together or apart and which disengagably locks them in place. This assembly is illustrated in FIG. 5.

More particularly, the assembly 15 comprises an outer tube 16, which houses and protects an inner mechanism 17.

The outer tube 16 is open-ended and defines an elongated inner first chamber or bore 18 extending longitudinally therethrough.

An inner tube 19 is provided for telescopic movement within the bore 18 of the outer tube 16. The inner tube 19 has an inner, open-ended section 20 extending into the first bore 18 and an outer section 21 protruding therefrom. The inner tube 19 defines a second chamber or bore 22 which is open at its inner end 33.

A threaded bolt 25 is rotatably mounted within the first bore 18 and extends into the second bore 22. More particularly, the bolt 25 extends through a plate 30 connected to the wall 31 of the outer tube 16 and is suspended coaxially within the bores 18, 22.

An internally threaded nut 32 is mounted on the bolt 25 for movement therealong. The nut 32 is connected to the side wall 33 of the inner tube 19, so that the tube 19 travels with the nut 32.

The first jaw 8a is connected with the outer section 21 of the inner tube 16 at its first end. The second jaw 8b is connected with the outer tube 16 at its second end. The first jaw 8a therefore moves with the inner tube 19, toward or away from the second jaw 8b.

The bolt 25 has a head 34 which is slightly recessed within the second end 35 of the outer tube 16. A wrench (not shown) can therefore be inserted to engage the head 34, turn the bolt 25 and thereby tighten the inner concave surfaces 9 of the jaws 8a, 8b against the outer side surfaces 10a, 10b of the pair of adjacent pipe joints 2. When so tightened, the bolt 25 will function to hold the jaws 8a, 8b in place, thereby locking the joints 2 together in the form of a substantially non-rotatable, flat structure or beam 7.

What is claimed is:

1. A clamp for use in disengagably locking together a pair of cylindrical tubular joints of oilfield pipe, selected from the group consisting of drill pipe and well casing, to convert them into a flat structure that resists rotation and is suitable to function as a chock on drill rig pipe racks, comprising:
    a pair of jaws having opposed rounded concave inner surfaces configured and dimensioned to conform with the outer side surfaces of the pipe joints and to extend down past their notional midlines; and
    an assembly for supporting the jaws and operative to move them together and apart, so that, in use, the clamp may be positioned over the pair of joints and the jaws tightened against the joints' outer side surfaces to lock the joints together in contiguous contact.

2. The clamp as set forth in claim 1 wherein the assembly comprises:
    an outer tube defining an inner first chamber extending longitudinally therethrough and having first and second open ends;
    an inner tube having an inner section extending into the first open end and an outer section protruding therefrom, said inner tube defining a second chamber;
    a threaded bolt rotatably mounted within and fixedly connected to the outer tube, said bolt extending longitudinally of the first chamber and into the second chamber;
    an internally threaded nut mounted on the bolt for movement therealong, said nut being connected to the inner tube;
    one jaw being connected to the outer section of the inner tube for movement therewith and the other jaw being connected with the second end of the outer tube;
    whereby the bolt may be accessed through the second open end of the outer tube and rotated to advance the inner tube into or out of the first chamber, thereby moving the jaws together or apart.

3. A method for forming a chock suitable to extend across a pair of drill rig pipe racks which are to support joints of cylindrical oilfield pipe, selected from the group consisting of drill pipe and well casing, comprising:
    mounting a clamp in accordance with claim 1 on a pair of contiguous joints of the pipe; and
    tightening and locking the clamp's jaws against the outer side surfaces of the pair of joints so as to convert the joints into a substantially non-rotatable structure for service as the chock.

4. A chock for use on drill rig pipe racks, comprising:
    a pair of cylindrical tubular joints of oilfield pipe, selected form the group consisting of drill pipe and well casing; and
    a clamp in accordance with claim 1 positioned across the pair of joints and locking them together in contiguous contact.

* * * * *

UNITED STATES PATENT AND TRADEMARK OFFICE
CERTIFICATE OF CORRECTION

PATENT NO. : 9,605,775 B2
APPLICATION NO. : 14/288483
DATED : March 28, 2017
INVENTOR(S) : William Marsh Page 1 of 1

It is certified that error appears in the above-identified patent and that said Letters Patent is hereby corrected as shown below:

In the Claims

Column 4, Line 36 "form" should be --from--

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*